(12) United States Patent
Branscomb

(10) Patent No.: US 11,651,349 B2
(45) Date of Patent: May 16, 2023

(54) COMPENSATION MANAGEMENT SYSTEM FOR RULES-BASED BEHAVIOR

(71) Applicant: Hood Mountain, LLC, Ingleside, TX (US)

(72) Inventor: Bennett Hill Branscomb, Ingleside, TX (US)

(73) Assignee: HOOD MOUNTAIN, LLC, Ingleside, TX (US)

( * ) Notice: Subject to any disclaimer, the term of this patent is extended or adjusted under 35 U.S.C. 154(b) by 0 days.

(21) Appl. No.: 17/243,037

(22) Filed: Apr. 28, 2021

(65) Prior Publication Data

US 2021/0357905 A1 Nov. 18, 2021

Related U.S. Application Data

(60) Provisional application No. 63/023,631, filed on May 12, 2020.

(51) Int. Cl.
| | |
|---|---|
| *G06Q 20/32* | (2012.01) |
| *G06Q 20/06* | (2012.01) |
| *H04W 4/02* | (2018.01) |
| *G06Q 20/36* | (2012.01) |
| *H04W 4/029* | (2018.01) |

(52) U.S. Cl.
CPC ....... *G06Q 20/3224* (2013.01); *G06Q 20/065* (2013.01); *G06Q 20/326* (2020.05); *G06Q 20/3223* (2013.01); *G06Q 20/367* (2013.01); *H04W 4/023* (2013.01); *H04W 4/029* (2018.02)

(58) Field of Classification Search
CPC .............. G06Q 20/3224; G06Q 20/326
See application file for complete search history.

(56) References Cited

U.S. PATENT DOCUMENTS

| | | | |
|---|---|---|---|
| 7,340,411 B2* | 3/2008 | Cook ................. | G06Q 30/0203 705/7.33 |
| 9,137,389 B2* | 9/2015 | Neal .................. | G06Q 30/0273 |
| 9,558,665 B2* | 1/2017 | Wang .................... | G08G 1/017 |
| 9,571,968 B1* | 2/2017 | Barron .................. | H04W 64/00 |
| 9,639,994 B2* | 5/2017 | Beaurepaire .......... | G08G 1/202 |
| 10,437,566 B2* | 10/2019 | Krishnamurthy ......... | G06F 8/20 |
| 10,492,032 B2* | 11/2019 | Chheda .................... | H04W 4/02 |
| 10,672,244 B2* | 6/2020 | Jones ..................... | H04L 61/35 |
| 11,151,549 B2* | 10/2021 | Ehrlich-Quinn ..... | G06Q 20/326 |
| 2003/0050537 A1* | 3/2003 | Wessel ................... | G16H 20/10 600/300 |
| 2010/0015584 A1* | 1/2010 | Singer .................... | G06Q 30/02 434/236 |

(Continued)

FOREIGN PATENT DOCUMENTS

EP 3751488 A1 * 12/2020 .......... G06Q 20/085

*Primary Examiner* — Daniel S Felten
(74) *Attorney, Agent, or Firm* — NEO IP

(57) ABSTRACT

A method for managing and providing compensation between devices in order to encourage positive behavior is disclosed. The system is operable to receive a request for providing compensation to a user account and is further operable to fulfil the request, track the compensation transfer, and provide historical data of the transfer based on geographic location. The geographic locations preferably include multiple tiers of permissions that are managed by multiple governing entities.

18 Claims, 9 Drawing Sheets

(56) References Cited

U.S. PATENT DOCUMENTS

| | | | |
|---|---|---|---|
| 2012/0308970 A1* | 12/2012 | Gillespie | G09B 5/06 |
| | | | 434/236 |
| 2015/0206206 A1* | 7/2015 | Puente | G06Q 30/0645 |
| | | | 705/307 |
| 2016/0364679 A1* | 12/2016 | Cao | G06Q 50/30 |
| 2016/0364812 A1* | 12/2016 | Cao | G06Q 50/30 |
| 2016/0364823 A1* | 12/2016 | Cao | G01C 21/3438 |
| 2016/0379494 A1* | 12/2016 | Bhuiya | G05D 1/0291 |
| | | | 701/117 |
| 2017/0178174 A1* | 6/2017 | Mitchell | G06Q 30/0226 |
| 2017/0200368 A1 | 7/2017 | Levine et al. | |
| 2018/0189717 A1* | 7/2018 | Cao | G06Q 50/30 |
| 2019/0043364 A1* | 2/2019 | Jumpertz | G08G 1/0965 |
| 2019/0303925 A1* | 10/2019 | Harris | G06Q 20/3821 |
| 2019/0378415 A1 | 12/2019 | Shinohara et al. | |
| 2019/0392415 A1 | 12/2019 | Kline et al. | |
| 2020/0051117 A1* | 2/2020 | Mitchell | G06Q 30/0239 |
| 2021/0319424 A1* | 10/2021 | Shah | G06F 40/30 |
| 2021/0374752 A1* | 12/2021 | Matsutani | G06Q 20/3224 |
| 2022/0084024 A1* | 3/2022 | Mossoba | G06Q 20/389 |
| 2022/0092575 A1* | 3/2022 | Zheng | G06Q 20/308 |
| 2022/0129903 A1* | 4/2022 | Sambhar | G06Q 20/40145 |

* cited by examiner

COMPENSATION MANAGEMENT SYSTEM FOR RULES-BASED BEHAVIOR

CROSS-REFERENCES TO RELATED APPLICATIONS

This application relates to and claims priority from the following U.S. patent applications. This application claims priority from U.S. Provisional Patent Application No. 63/023,631, filed May 12, 2020. Each of the above-mentioned applications is incorporated herein by reference in its entirety.

BACKGROUND OF THE INVENTION

1. Field of the Invention

The present invention relates to systems that manage compensation transactions between parties and more specifically to systems that provide compensation based on behaviors.

2. Description of the Prior Art

Interpersonal behaviors are generally interpreted as positive or negative based on both social norms and established rules and regulations. While positive and negative behaviors sometimes result in positive or negative social consequences, there is often no tangible reward or punishment for performing these behaviors. For example, people may choose to disassociate from an individual performing negative behaviors. Similarly, the prior art has been unable to integrate the positive and negative social aspects of human interaction into technological systems, both autonomous and otherwise.

It is generally known in the prior art to provide micro-payments in exchange for goods or services, but these systems do not take into account any positivity or negativity in the goods or services, and they do not encourage any positive or negative behavior. Additionally, though there may be communication between two parties in the exchange, the communication does not take into account established social norms and established rules and regulations.

Prior art patent documents include the following:

U.S. Patent Publication No. 20190392415 for Framework to promote positive vehicular behaviors via a social payment construct by inventors Kline, et al., filed on Jun. 22, 2018, and published on Dec. 26, 2019, is directed to: "Aspects of the invention include detecting, at a first vehicle, a traffic action by a second vehicle. One of a positive action and a rebuke action is selected based on the detected traffic action. Based on the positive action being selected, the selected positive action is transmitted to the second vehicle for communication to the operator of the second vehicle. Based on the rebuke action being selected, the selected rebuke action is transmitted to the second vehicle for communication to the operator of the second vehicle."

U.S. Patent Publication No. 20190043364 for Method and system for requesting and granting priority between vehicles by inventor Jumpertz, filed on Jul. 27, 2018, and published on Feb. 7, 2019, is directed to: "The disclosure relates to a method for requesting and granting priority between a host vehicle and other vehicles, and to a system which implements the method. The host vehicle, through the use of on-board vehicle sensors, detects and identifies an impeding vehicle which interferes with the host vehicle's path. The host vehicle transmits a priority request to the impeding vehicle. The priority request includes a remuneration offer. The impeding vehicle evaluates the priority request, including the sufficiency of the host vehicle's remuneration offer, and grants or denies the host vehicle's priority request. If granted, the impeding vehicle modifies its path to be less impeding to the host vehicle, for example by assuming a cooperative path that lets the host vehicle pass the impeding vehicle."

U.S. Patent Publication No. 20190378415 for Lane change assist system, lane change assist device, and lane change assist method by inventors Shinohara, et al., filed on Jun. 4, 2019, and published on Dec. 12, 2019, is directed to: "A lane change assist system provided with a first terminal in a first vehicle, a second terminal in a second vehicle, a third terminal in a third vehicle, and a lane change assist device, wherein the lane change assist device is configured to decrease the economic value held by the user of the first terminal or the first vehicle and increase the economic value held by the user of the third terminal or the third vehicle when the first vehicle driving on the first driving lane cuts into between the second vehicle and the third vehicle driving following one after the other on a second driving lane adjoining the first driving lane and changes lanes to the front of the third vehicle driving at the rear of the second vehicle."

U.S. Patent Publication No. 20170200368 for Method and system for vehicle congestion pricing by inventors Levine, et al., filed Jan. 9, 2017, and published on Jul. 13, 2017, is directed to: "A system and method for coordination between at least two participating vehicles for peer-to-peer trade of the vehicles' positions including a local device on the participating vehicle that measures and transmits at least one output signal; a computing device configured to receive the at least one output signal from the device and display the at least one output signal in real-time; a graphical user interface on the computing device that allows a system administrator to view and customize options for monitoring the at least one output signal; and a hosted server that initiates a peer-to-peer trade of the participating vehicle's position based on determination of a multitude of factors, wherein the local device and the computing device are communicatively connected to each other via a communications network, and wherein the participating vehicle is human-driven, partially-automated, or fully-automated."

SUMMARY OF THE INVENTION

The present invention relates to managing and providing compensation between devices based upon established rules and ownership according to a geographic location.

It is an object of this invention to allow for transactions to occur between two parties in compensation for performing a behavior and particularly to encouraging positive behaviors for both humans and digital systems.

In one embodiment, the present invention is directed to a system for managing compensation for behaviors, including a server platform in communication with at least one service point and a plurality of user devices, wherein each of the at least one service point includes a geofence defining a participation space, wherein each of the plurality of user devices is associated with a user profile, including a quantity of tokens, wherein the server platform is operable to receive a token transfer request from a first user device, including a designation of at least one other user device within the same participation space as the first user device, and wherein the server platform is operable to transfer at least one token from the first user device to the at least one other user device in response to the token transfer request.

In another embodiment, the present invention is directed to a system for managing compensation for behaviors, including a server platform in communication with at least one service point and a plurality of user devices, wherein each of the plurality of user devices is associated with a user profile, including a quantity of tokens, wherein the server platform is operable to receive a token transfer request from a first user device, including a designation of at least one other user device within the same participation space as the first user device, wherein the server platform is operable to transfer at least one token from the first user device to the at least one other user device in response to the token transfer request, and wherein each of the plurality of user devices is associated with a vehicle and wherein a position of the vehicle on a road is determined by the quantity of tokens in the user profile associated with each of the plurality of user devices.

In yet another embodiment, the present invention is directed to a method for managing compensation for behaviors, including providing a server platform in communication with at least one service point and a plurality of user devices, wherein each of the at least one service point includes a geofence defining a participation space, wherein each of the plurality of user devices is associated with a user profile, including a quantity of tokens, the server platform receiving a token transfer request from a first user device, including a designation of at least one other user device within the same participation space as the first user device, and the server platform transferring at least one token from the first user device to the at least one other user device in response to the token transfer request.

These and other aspects of the present invention will become apparent to those skilled in the art after a reading of the following description of the preferred embodiment when considered with the drawings, as they support the claimed invention.

DETAILED DESCRIPTION

Figure 1:
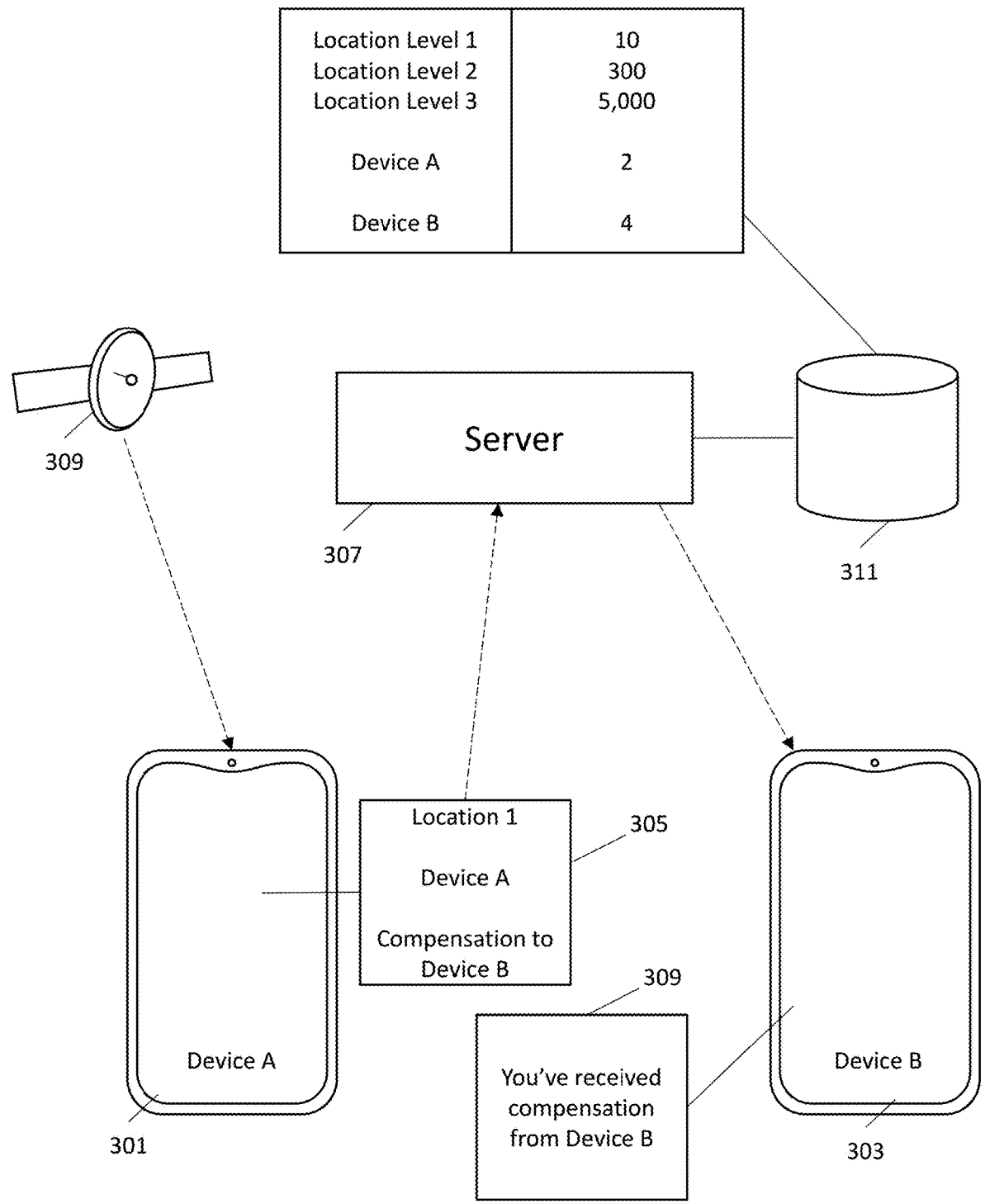
FIG. 1 illustrates a schematic diagram of a compensation transaction between two devices with metadata tracking and storing according to one embodiment of the present invention.

The present invention is generally directed to a system for sending, receiving, and managing compensation between parties based on real-world behaviors and actions.

In one embodiment, the present invention is directed to a system for managing compensation for behaviors, including a server platform in communication with at least one service point and a plurality of user devices, wherein each of the at least one service point includes a geofence defining a participation space, wherein each of the plurality of user devices is associated with a user profile, including a quantity of tokens, wherein the server platform is operable to receive a token transfer request from a first user device, including a designation of at least one other user device within the same participation space as the first user device, and wherein the server platform is operable to transfer at least one token from the first user device to the at least one other user device in response to the token transfer request.

In another embodiment, the present invention is directed to a system for managing compensation for behaviors, including a server platform in communication with at least one service point and a plurality of user devices, wherein each of the plurality of user devices is associated with a user profile, including a quantity of tokens, wherein the server platform is operable to receive a token transfer request from a first user device, including a designation of at least one other user device within the same participation space as the first user device, wherein the server platform is operable to transfer at least one token from the first user device to the at least one other user device in response to the token transfer request, and wherein each of the plurality of user devices is associated with a vehicle and wherein a position of the vehicle on a road is determined by the quantity of tokens in the user profile associated with each of the plurality of user devices.

In yet another embodiment, the present invention is directed to a method for managing compensation for behaviors, including providing a server platform in communication with at least one service point and a plurality of user devices, wherein each of the at least one service point includes a geofence defining a participation space, wherein each of the plurality of user devices is associated with a user profile, including a quantity of tokens, the server platform receiving a token transfer request from a first user device, including a designation of at least one other user device within the same participation space as the first user device, and the server platform transferring at least one token from the first user device to the at least one other user device in response to the token transfer request.

None of the prior art discloses using historical compensation data, metadata associated with compensation, and rules and regulations associated with geographic locations in order to encourage and promote positive behaviors for both machines and individuals. Though the prior art may disclose microtransactions in general and may communicate, for example, communication between vehicles, there is currently no system that encourages positive behavior through providing, tracking, and managing compensation between devices and profiles while also utilizing these transactions in determining future activities. In one embodiment, the system disclosed provides for encouragement of behavior and conflict resolution between autonomous or semi-autonomous vehicles in accordance with set behavioral patterns.

The classic game theory problem of the prisoner's dilemma probes the incentives of an individual to collaborate or defect with their peers in a zero-sum environment. Game theorists have noted that choosing to defect and betray one's peers is the rational decision to maximize self-interest. However, life is not a zero-sum game. Robert Axelrod found in his book The Evolution of Cooperation that when the prisoner's dilemma is repeatedly iterated, greedy strategies tend to do poorly and altruistic ones tend to do better. This is especially true when each player has knowledge of other player's past decision-making, as individuals tend to respond to others' decisions in a tit-for-tat manner and therefore it is rationally advantageous to make decisions for that impact one's peers in a similar manner to how one would like to be impacted. It is desirous, therefore, to produce a system able to keep track of and reward individual decision-making in order to encourage altruistic behavior on a larger scale.

The present invention includes, in one embodiment, a compensation system for promoting positive behavior in physical space. The system manages and controls compensation between at least two devices and/or profiles associated with two entities. The system is further operable to offer and/or provide compensation in exchange for both public and private interactions as well as commercial and personal interactions. In one embodiment, a user requests an action from a second user, wherein upon completion of the action, the requesting user is operable to initiate a transaction providing compensation to the second user. Preferably, the system is operable to track and store records of the compensation, for example by managing and storing the compensation directly, by facilitating transfer of the compensation between parties, and/or by tracking and storing account information for a plurality of users and profiles.

In one embodiment, the system is operable to enforce behavior and activities based on profile elements, including compensation balances, affiliations, classes, hierarchy, activities, and priorities, and based on geographic locations. For example, in one embodiment, the system is operable to receive a request for an autonomous vehicle to drive in a fast lane of a highway. Based on a determined compensation balance associated with the drive of the autonomous vehicle or the autonomous vehicle itself being greater than a predefined threshold for the fast lane, the request is granted, and the autonomous vehicle is enabled to move within the fast lane. In another embodiment, an autonomous vehicle is operable to detect an emergency vehicle approaching from behind and, based on the detection and/or a request from the emergency vehicle, the autonomous vehicle is operable to move to another position that creates a clear path for the emergency vehicle. In one embodiment, the system is operable to facilitate a transfer of compensation from an account associated with the emergency vehicle to an account associated with the autonomous vehicle. In another embodiment, the system is operable to provide compensation to the account associated with the autonomous vehicle directly without debiting any amount from another account.

Compensation in the present invention includes, in one embodiment, any form of value that is provided digitally through the system, including: financial compensation, points, rewards, coupons, or any other measurable value transfer known in the art. For example, financial compensation includes at least one of: fiat currency, cryptocurrency, or digital currency. Points include any valuable count operable to be managed and/or manipulated by the system. For example, in one embodiment, the system is operable to adjust a number of "nudges," or internally managed measures of value and reputation, for user accounts. For example, the system is operable to receive a request for transferring a nudge from a first user account to a second user account, wherein upon performing the request, the count of nudges in a first user's account is decreased by one or more, and the count of nudges in a second user's account is increased by a corresponding amount. In a further embodiment, the system is operable to provide non-numerical compensation, including coupons or discount codes for one or more merchants, downloadable media objects, or a publicly presentable content, such as an icon, avatar, or badge operable to be associated with a user account. In one embodiment, the system awards user accounts a set number of compensation elements per day. For example, a user account is provided with 5 nudges per day, and if the nudges are not used, they expire. In another example, a user account is provided with $5.00 per day that the system is operable to use for micropayments to other users.

In one embodiment, compensation occurs through micropayments, wherein the system is operable to digitally award or transfer a small portion of money to an account. For example, micropayments in one embodiment are financial payments that are less than approximately $10.00. In another embodiment, the amounts are less than approximately $1.00. In a further embodiment, the amounts are less than approximately $0.01. Point-based systems are operable to be transferred for financial equivalent and/or redeemed for other digital rewards and incentives. For example, in one embodiment, an account holds 500 nudges. The system is operable to facilitate a redemption of the 500 nudges to convert the nudges into $5.00. In another embodiment, the nudges are operable to be transferred and/or converted to one or more external rewards system, such as a credit card rewards system, an airlines rewards system, or a rental car rewards system. The system is operable to be in network communication with one or more external incentives or rewards server and communicate to the external incentives or rewards server a value of the compensation that is being transferred to the external system. For example, in one embodiment, 25 nudges are redeemed for the equivalent of 1,000 points on a credit card rewards system. In another embodiment, the 25 nudges are redeemed for a $5 account credit for a credit card. The system is operable to communicate with one or more external entities via any form of network communication known in the art, including via an Application Programming Interface (API) that is managed by an external server for receiving queries from the system or is managed internally for receiving queries from an external server.

In one embodiment, the system is operable to manage compensation accounts internally for each user account. In another embodiment, the system is operable to communicate with one or more external servers and systems that manage and store the compensation. External servers and systems include financial entities (such as banks), payment networks (such as VISA) payment processors, gateways, external rewards systems, or any other system operable to manage compensation value. For example, in one embodiment, the system is operable to automatically deposit and/or debit an amount from a bank account or digital wallet associated with a user account.

When compensation transfers are initiated, the system is preferably operable to track and store a location of the transfer in at least one memory and database. In one embodiment, the database is publicly accessible, wherein the system is operable to provide data for at least one location based on the transactions that have occurred within a geographic location. For example, if a traveling vehicle has a choice between traveling through a first zone and a second zone, the system is operable to provide statistics on the transaction occurrences that have occurred within each of the zones. Based on an automatic or manual selection, the autonomous vehicle is operable to travel through the zone with the greatest number of transactions that have occurred.

In one embodiment, transactions are limited based on environment, equipment, and location. For example, an autonomous vehicle on a road has options of compensating other vehicles for any preset number of actions, such as at least one of: slowing down, speeding up, changing lanes, clearing a path for a vehicle, or giving right-of-way to another vehicle. In another example, an unmanned aerial vehicle (UAV) is operable to send compensation to at least one account associated with one or more locations that the UAV is flying over. In a further example, an application on a mobile device is operable to determine a location of the mobile device is within a work complex. The application is operable to initiate a transfer of compensation to a user account based on preset actions provided by a managing entity of the geographic location, including assisting on a project or holding a door for coworker.

Referring now to the drawings in general, the illustrations are for the purpose of describing one or more preferred embodiments of the invention and are not intended to limit the invention thereto.

The present invention includes a server platform in communication with at least one service point. The server platform generates a geofence for each service point, defining a participation space. User devices within the same participation space are able to send and/or receive tokens from one another. In one embodiment, user devices not within the same participation space are not able to send and/or receive tokens from one another. In one embodiment, user devices are able to send and/or receive tokens from one another for any reason, determined solely by the user device sending the tokens. In another embodiment, the server platform is in communication with at least one rule-defining entity.

As shown in FIG. 1, in one embodiment, the server platform includes at least one database. The server platform tracks the total amount of token transfers, the total amount of tokens transferred, the average number of token transfers within a particular amount of time, and/or the average number of token transferred within a particular amount of time for each individual service point and/or individual locations within each service point. In the illustrated embodiment, Device A 301 initiates a transaction to provide compensation to Device B 303. Device A 301 provides a message 305 to the server 307 identifying the location of Device A 301, an identifier for Device A 301, a compensation amount, and an identifier for Device B 303. The location of Device A 301 is, in one embodiment, determined based at least partly upon signals from geopositioning satellites 309. Upon receiving the message 305 from Device A 301, the server 307 is operable to transmit a notification and/or request 309 to Device B 303 indicating received compensation. In one embodiment, Device B 303 is operable to accept or decline the compensation, and the server is operable to continue with the transaction based on the accepted request 309. Preferably, locations of the transactions, (e.g., a location of Device A and/or a location of Device B) are tracked and stored in a database 311. Stored within the database are indications of transactions and counts of compensation. For example, if Device A 301 provided a "nudge" to Device B 303, the server is operable to increase a "nudge count" for Device B 303 by one. Notably, devices in the system are not limited to smartphones, but instead the system is operable to interface with any computer device operable to initiate a compensation transaction. For example, devices include: a cell phone, a smartphone, a tablet, a laptop, a desktop computer, a smartwatch, a car, a truck, a bus, a scooter, or any other transportation device and/or mobile computing device. Accounts in the system are operable to be accessed by the devices, and the devices are operable to associated with an account in the system.

Figure 2:
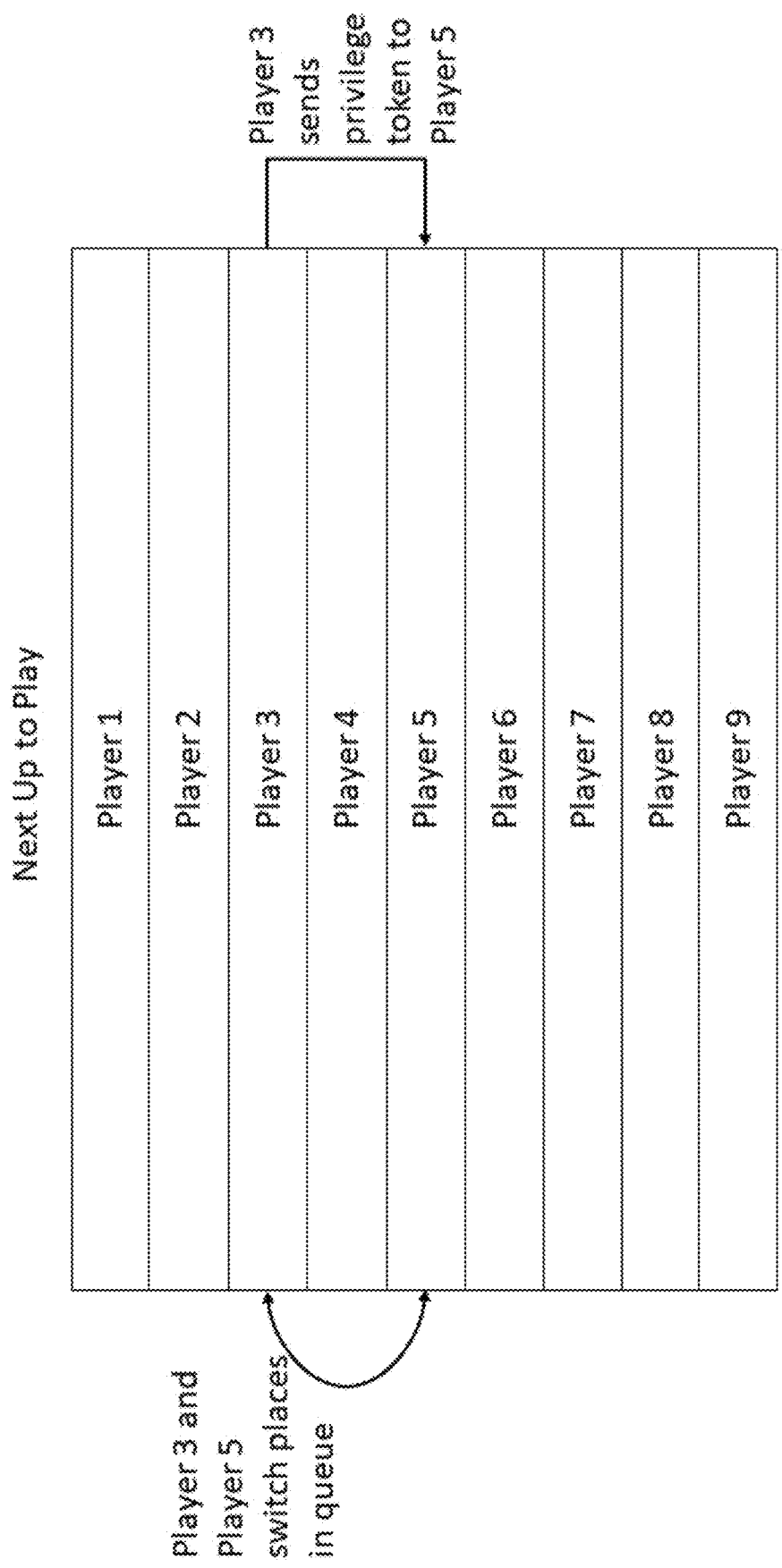
FIG. 2 illustrates a diagram of a compensation transaction between two players waiting in a queue according to one embodiment of the present invention.

The at least one rule-defining entity is associated with one or more service points. The at least one rule-defining entity is able to set conditions under which tokens are able to be transferred within the participation space of the one or more service points and/or the benefits provided by tokens within the participation space of the one or more service points. For example, in one embodiment, the at least one rule-defining entity is a golf-course. The golf course includes a queue, defining a sequential list of players desiring to play a round of golf. As shown in FIG. 2, a token is able to represent a place in line in the queue, such that one player transferring a token to a player lower to them in the queue allows the recipient player to advance in the queue and/or replace the transferring player in the queue. Furthermore, players are able to share tokens with one another based on how well they played a round of golf or based on how quickly the players finished the round of golf relative to the average amount of time taken to complete a course. The golf course is able to allow tokens to be exchanged for discounts at a pro shop associated with the golf course, and/or the tokens are able to simply be exchanged for value with the server platform directly.

More generally, the present invention is particularly useful in situations where many people are forced to wait in a queue, or wherein there is limited space and too much demand to accommodate every willing participant at once. Because the present invention allows individuals to exchange their ability to participate in a limited space for other value, the present invention encourages a market to form in which individuals most wanting to participate are more likely to be able to do so, while other individuals still receive a benefit. This further has the potential to decrease the efficiency of individuals moving through the limited space. For example, if a first individual is in a grocery line with a full cart and a second individual behind them only has a few items, it is likely that the first individual would be willing to accept a small payment to allow the second individual to go first. However, it is likely that someone with few items would allow someone with a full cart behind them to go in front of them for a small payment. Therefore, low volume customers are able to more freely go through the store, while higher volume customers don't need to wait a substantial additional amount of time and receive some benefit anyways.

In one embodiment, each user device is associated with a user profile. Each user profile is associated with a quantity of tokens. In one embodiment, a user profile also includes identifying information, such as a name, a username, an email address, a phone number, a home address, a profile picture, and/or a list of favorite locations. In one embodiment, the quantity of tokens is divided into "grant tokens" and "privilege tokens." Grant tokens are able to be transferred to another user device, such as when another user performs a good deed or when a privilege is intended to be granted to the recipient user device. Privilege tokens are tokens received from another user device. Therefore, what is a grant token for one user device counts as a privilege token for the user device to which it is sent. In another embodiment, the quantity of tokens are not divided into separate token types and all tokens are interchangeable.

In one embodiment, grant tokens exist solely to provide to another person. In one embodiment, the server platform grants each user device a number of grant tokens after a predetermined amount of time has elapsed. In another embodiment, a server platform grants each user device a number of grant tokens dependent on how many privileged tokens they have received. By limiting the quantity of grant tokens a user is able to send within a particular amount of time, the value of each grant token is increased, as users are less likely to want to distribute all grant tokens to a single recipient or to give grant tokens for relatively frivolous purposes. In another embodiment, grant tokens have a limited lifetime and expire after a predetermined amount of time has elapsed in order to encourage users to distribute grant tokens in recognition of rewardable behaviors.

In one embodiment, a user is able to "cash out" a number of privilege tokens in exchange for a quantity of fiat currency. For example, in one embodiment, when a user device transmits a compensation request (including a designated number of privilege tokens) the server platform is operable to automatically remove the designated number of privilege tokens from the user profile and automatically transfer a quantity of fiat currency and/or cryptocurrency to a financial account (e.g. a bank account) associated with the user profile. In another embodiment, privilege tokens serve as status identifiers. For example, when an individual has a sufficient number of privilege tokens, they are allowed in an otherwise restricted area and/or able to use an otherwise restricted device and/or service. In yet another embodiment, individuals are ranked in the service platform based on the number of lifetime privilege tokens they have received and/or the number of privilege tokens they have received within a particular amount of time. By separating grant tokens from privilege tokens, the system encourages users to give grant tokens, as the giving of such grant tokens does not decrease the total amount of privilege tokens the user has in their own account.

Figure 3:
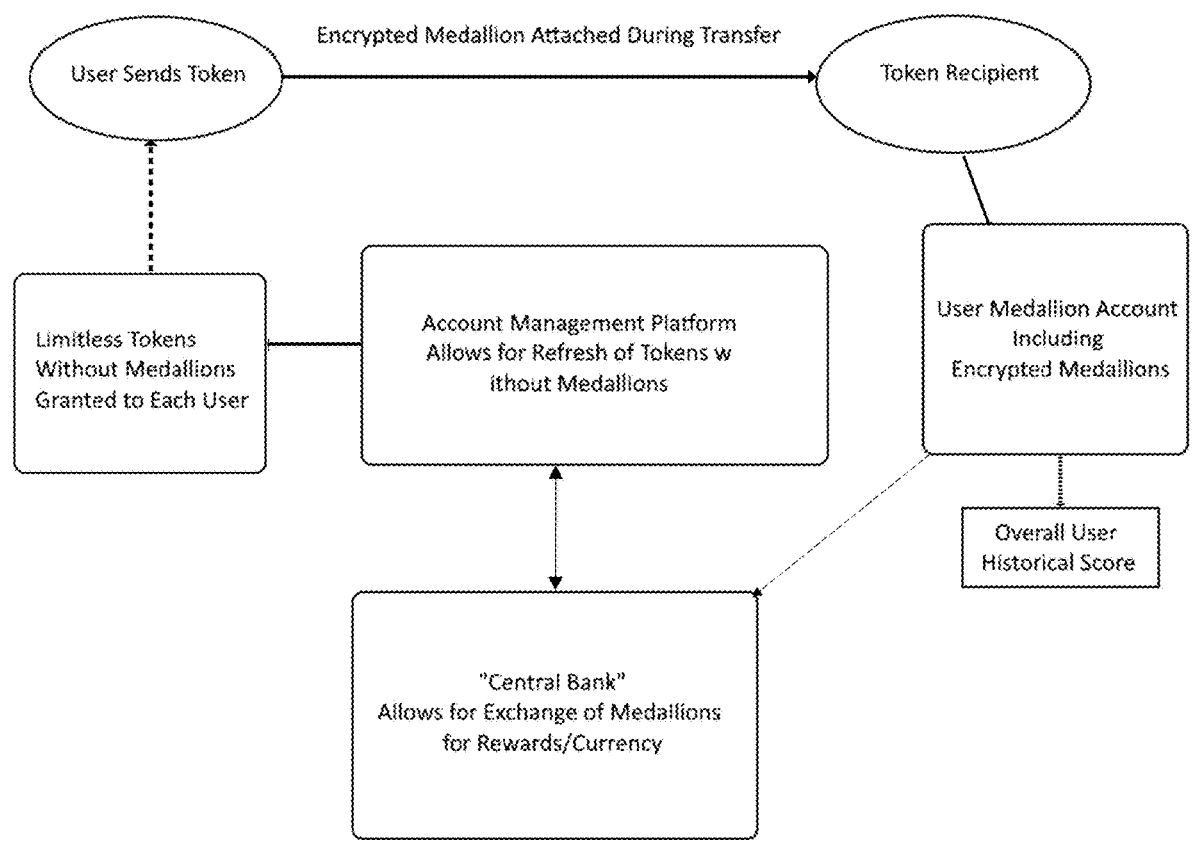
FIG. 3 illustrates a diagram of a platform facilitating an exchange of tokens according to one embodiment of the present invention.

In another embodiment, tokens are not divided into grant tokens and privilege tokens. Instead, as shown in FIG. 3, users receive unlimited tokens. Tokens, by themselves, are unable to be used for any purpose other than giving them to another user, but when given to another user, the system automatically adds an encrypted medallion element to the token. The medallion is able to be exchanged with the system directly for fiat currency or cryptocurrency, or is able to be used to be granted privileged access to one or more locations or interconnected systems. In one embodiment, the system only adds a medallion to a transferred token for specific transactions and not for any and all transactions. Because the medallions are encrypted with a key only known to the server platform, individuals are unable to spoof medallions to receive rewards from the server computer.

In one embodiment, each user account is associated with at least one historical score. The historical score tracks how many tokens been given to other users and/or received from other users over time. In one embodiment, participation of a user in a particular program associated with the server platform and/or access to a particular area is limited based on the at least one historical score of the user. In one embodiment, the at least one historical score does not only include the total number of tokens given to or received from other users, but also includes information regarding the individuals to whom tokens were given or from whom tokens were received. For example, in one embodiment, the at least one historical score gives a user a higher score if they give tokens to other users with lower historical scores. In another embodiment, the at least one historical score increases when a token is given to another user from whom the giving user had previously received a token, indicating that the giving user is willing to return the favor. In one embodiment, an artificial intelligence module is used to calculate the at least one historical score based on a user's past pattern of giving and receiving tokens.

In one embodiment, the server platform allows users to initiate requests for assistance and/or requests for transactions with other users. Requests for assistance and/or requests for transactions are able to be indicated on a local map to all users within the same participation space. In addition, requests for assistance and/or requests for transactions are also able to be sent directly to a particular user or a particular group of users. In one embodiment, other users are able to view the at least one historical score for users requesting assistance and/or requesting transactions. Because other users are able to see the historical score, users are able to decide whether to assist another user based on that other user's historical score, encouraging individuals to perform acts of kindness such that they have a higher historical score. In another embodiment, users are able to impose a minimum historical score needed in order to transact with them and/or a transaction fee of a specified amount for users below a set historical score.

Figure 4:
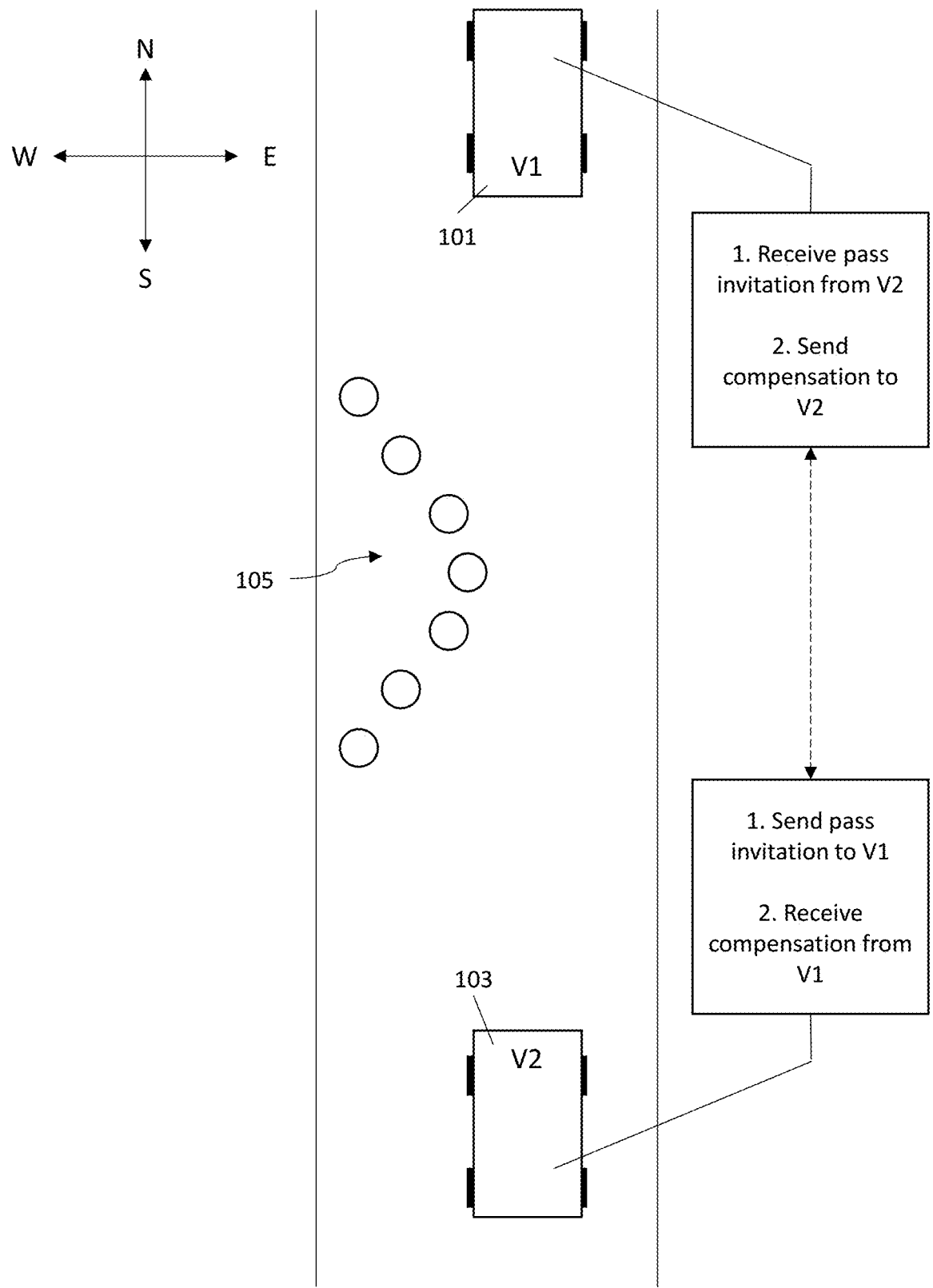
FIG. 4 illustrates a diagram of a compensation transaction between two vehicles according to one embodiment of the present invention.

FIG. 4 illustrates a vehicle embodiment of the compensation system, wherein a first vehicle (V1) 101 is traveling south and a second vehicle (V2) 103 is traveling north. Each of the vehicles approach a hazard 105 in the road. Since the road is narrow and only one vehicle can pass, this requires one of the vehicles to yield and the other to continue moving. In order to alleviate this situation, V2 103 is operable to send an invitation to V1 101 to continue first through the narrow roadway. Upon receiving the pass invitation from V2 103, V1 101 accepts the pass invitation, sends compensation to V2 103, and proceeds southward. Notably, each of the vehicles are connected to the compensation management system and are operable to communicate and/or transfer compensation via the system. The compensation management system is operable to be embedded within each of the vehicles, wherein each of the vehicles are operable to directly connect and communicate (i.e. via a wireless communication method, such as BLUETOOTH, WIFI, Near Field Communication (NFC), or ZIGBEE) to determine appropriate which vehicle proceeds first, or the compensation management system is operable to be located remotely from each of the vehicles, wherein each of the vehicles are in network communication with a remote server and provides an indication of an identifier of the other vehicle. Alternatively, the system is operable to match the vehicles based on a shared geographic location.

In one embodiment, which vehicle proceeds by the hazard first is determined based on a manually or automatically set priority. For example, in one embodiment, the system is operable to receive from a user a preference for priority for V1 101, wherein the priority is an amount that the user of V1 101 is willing to spend to proceed through the hazard 105 first and an amount that user is willing to receive to proceed second. The system is operable to compare the priority of V1 101 to V2 103 and determine which vehicle should pass based on a highest payment offered by one of the vehicles. In another embodiment, the priority is instead based on profile characteristics. For example, in one embodiment, a profile associated with V2 103 includes an indication of the vehicle being an emergency vehicle with an active mission.

The system is operable to automatically provide V2 103 with the right-of way through the hazard based on a priority of V2 103 being higher than the non-emergency vehicle V1 101. In one embodiment, the system is operable to provide to the vehicle V1 101 compensation in exchange for allowing the emergency vehicle V2 103 to pass.

The system is further operable to provide in this illustrated embodiment a notification to one or more of the vehicles based on a manually instigated invitation to pass or request to pass or based on an automatically determined and suggested passing vehicle. For example, in one embodiment, V1 101 receives an indication that V1 101 is determined to have a higher priority than V2 103. The system is operable to receive a decline response from V1 101 and provide an invitation to pass to V2 103. If the invitation is accepted, the system is further operable to provide compensation to an account associated with V1 101.

The system is operable to compare behaviors to both threshold and automatically or manually trained models for behaviors. For example, in a conflict between operations between a first vehicle and a second vehicle, the first vehicle is operable to manually set a threshold of urgency, preference, or compensation level that will result in the first vehicle moving, and the first vehicle is operable to communicate that threshold to the second vehicle. The system is operable to automatically and/or manually train a model based on these decisions such that the vehicle is operable to automatically make decisions on whether to move based on historical interactions and outcomes of these interactions. This creates a model that emulates human behavior in encouraging positive social interactions. In another embodiment, models are manually or automatically applied to a vehicle such that decisions on risk and conflict resolution are not decided by a user but instead are determined by enforced activities by, for example, an automobile manufacturer, traffic laws, a parent account, or any other governing entity. This model development is particularly important between cultures and nations, as desired operations of autonomous vehicles often differs between these groups. Basing vehicle operation based on historical data and compensated actions establishes behaviors that are in line with social norms. Though the term "vehicle" is used herein, it is anticipated that any device capable of performing real-world operations is operable to access and utilize the compensation system and behavioral thresholds and models.

Figure 5:
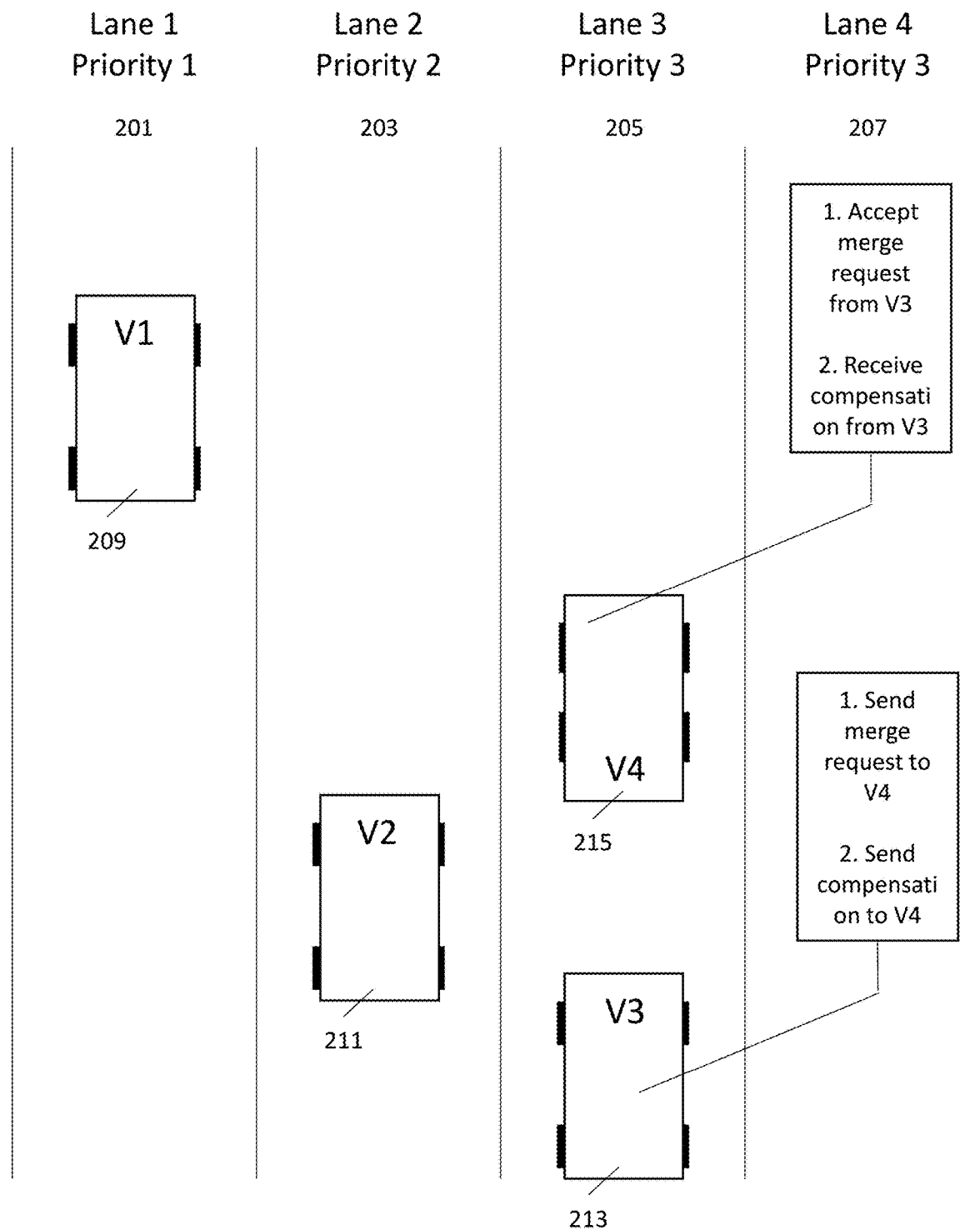
FIG. 5 illustrates a diagram of compensation management between vehicles across multiple lanes according to one embodiment of the present invention.

FIG. 5 illustrates another roadway embodiment of the present invention, wherein priorities are assigned based on both vehicle and based on lane. Lane 1 201 has a priority of 1, lane 2 203 has a priority of 2, and lanes 3 and 4 each have a priority of 3. In one embodiment, vehicles are permitted to drive in each of the lanes based on a determined priority associated with each of the vehicles. For example, V1 209 has a priority of 1 based on a determination of one or more profile elements, such as a number of vehicle occupants, a vehicle emergency, or an amount of accumulated compensation. In one embodiment, lane 1 201 is reserved for only vehicles with a compensation level above a first threshold, while lane 2 203 is reserved only for vehicles with a compensation level above a second, lesser threshold. For an autonomous vehicle scenario, if the compensation was nudges, and V1 209 had 500 nudges, V2 211 had 250 nudges, and the thresholds for lane 1 201 and lane 2 203 are 400 and 200, respectively, the vehicles are operable to automatically navigate the vehicle within an allowed lane with the least amount of traffic. In another embodiment, lanes are reserved based on an industry, wherein accounts associated with a vehicle or device within the vehicle include indications of a class of service or special travel permissions. Notably, vehicles are operable to be associated with a user account directly or additional devices associated with a driver (e.g., a mobile phone or a beacon) are operable to be identified during system operation.

If two cars are in the same priority lane, as illustrated with V3 213 and V4 215, the system is operable to facilitate transactions between the two vehicles based on preset priority levels. For example, if a user of V3 213 is in a hurry and is willing to compensate vehicles in front for clearing path in a lane, V3 213 is operable to be preset with manual levels of desired priority and/or compensation. When V3 213 approaches V4 215 in lane 3 205, the system is operable to determine that V4 215 includes a lower priority (i.e., a willingness to receive compensation for merging). V3 213 is operable to send a merge request to V4 215, and upon the merge request being accepted and V4 merging into lane 4 207, an account associated with V3 213 is operable to provide compensation to an account associated with V4 215.

In the embodiment illustrated in FIG. 5 and in similar embodiments, thresholds are established by one or more governing entities for a geographic area. For example, the roadway includes, in one embodiment, multiple levels of control governed by managing authorities. In one embodiment, a device queries the compensation system with its own geographic location and determines that an area is governed by a state at a first level and a nation at a second level. In addition, the system is operable to provide an indication of the rules associated with each of the levels, wherein a rule of the state is, for example, restriction of a vehicle speed for accounts with a set compensation level, and wherein a rule of the nation is restricting operation of an entertainment device for accounts with another compensation level. In one embodiment, the device is operable to automatically implement the identified rules for the geographic area. Further related functionality on determining geographic locations and rules is described below and illustrated in corresponding figures.

In one embodiment, compensation transactions are initiated manually. For example, in a customer service embodiment, the system is operable to receive a request to supply a compensation amount to a customer service representative based upon a positive interaction from a caller. In another embodiment, compensation transactions are completed automatically according to a determined behavior or activity. For example, a first vehicle is operable to determine that a second vehicle has slowed down to allow the first vehicle to pass. Upon detecting the behavior, the behavior is compared to a manually set threshold and/or a trained model to determine whether the action requires compensation to be initiated and how much the compensation should be.

In one embodiment, when a transaction occurs between a first account and a second account, any account identifier for the second account is operable to be used for completing the transaction from the first account to the second account. For example, in one embodiment, Device A 301 is operable to provide a phone number associated with the account for Device B 303. In another embodiment, Device A 301 is operable to provide a determined identifier obtained from a wireless signal (e.g., a BLUETOOTH signal) being broadcast from Device B 303. The system is operable to store in a server with a memory and database any information corresponding to individuals and/or devices associated with an account, including personally identifiable information, contact information, device types, device identifiers, a unique account identifier, location histories, and/or related classes, groups, and permissions.

In addition, location data is created in the present invention using one or more hardware and/or software components. By way of example and not limitation, location data is created using satellite-based positioning systems (e.g., Global Positioning System (GPS), Differential GPS (DGPS), or Galileo), low energy Bluetooth based systems such as beacons, wireless networks such as WiFi, Radio Frequency (RF) including RF Identification (RFID), Near Field Communication (NFC), magnetic positioning, cellular triangulation, and/or combinations of these technologies. By way of example, location data is determined via an Internet Protocol (IP) address of a device connected to a wireless network. A wireless router is also operable to determine identities of devices connected to the wireless network through the router, and thus is operable to determine the locations of these devices through their presence in the connection range of the wireless router.

In another embodiment, devices are operable to query the server for individual or location-based compensation data, wherein the server is operable to return historical data and statistics relating to accounts, devices, vehicles, locations, location groups, and/or events. For example, an application on a device is operable to query a server for information related to a geographic location, wherein the server is operable to receive the query and return any metadata associated with the geographic location. The metadata returned are the historical data and statistics for the geographic location, which include, for example, an amount of compensation transferred, a number of transactions that have occurred, a number of accounts that have transacted in the area, a number of negative transactions that have occurred, a number of positive transactions that have occurred, demographic information, owner information, rules for interactions within the geographic location, etc. In one embodiment, statistics for a particular individual, geographic location, and/or type of action are used to inform the value and/or effect of each token. For example, the statistics show that there is a low volume of token transfers for reordering a position in a queue, the value of the tokens are increased and/or the number of tokens needed to reorder the queue is increased such that the system incentivizes more transfers.

Figure 6:
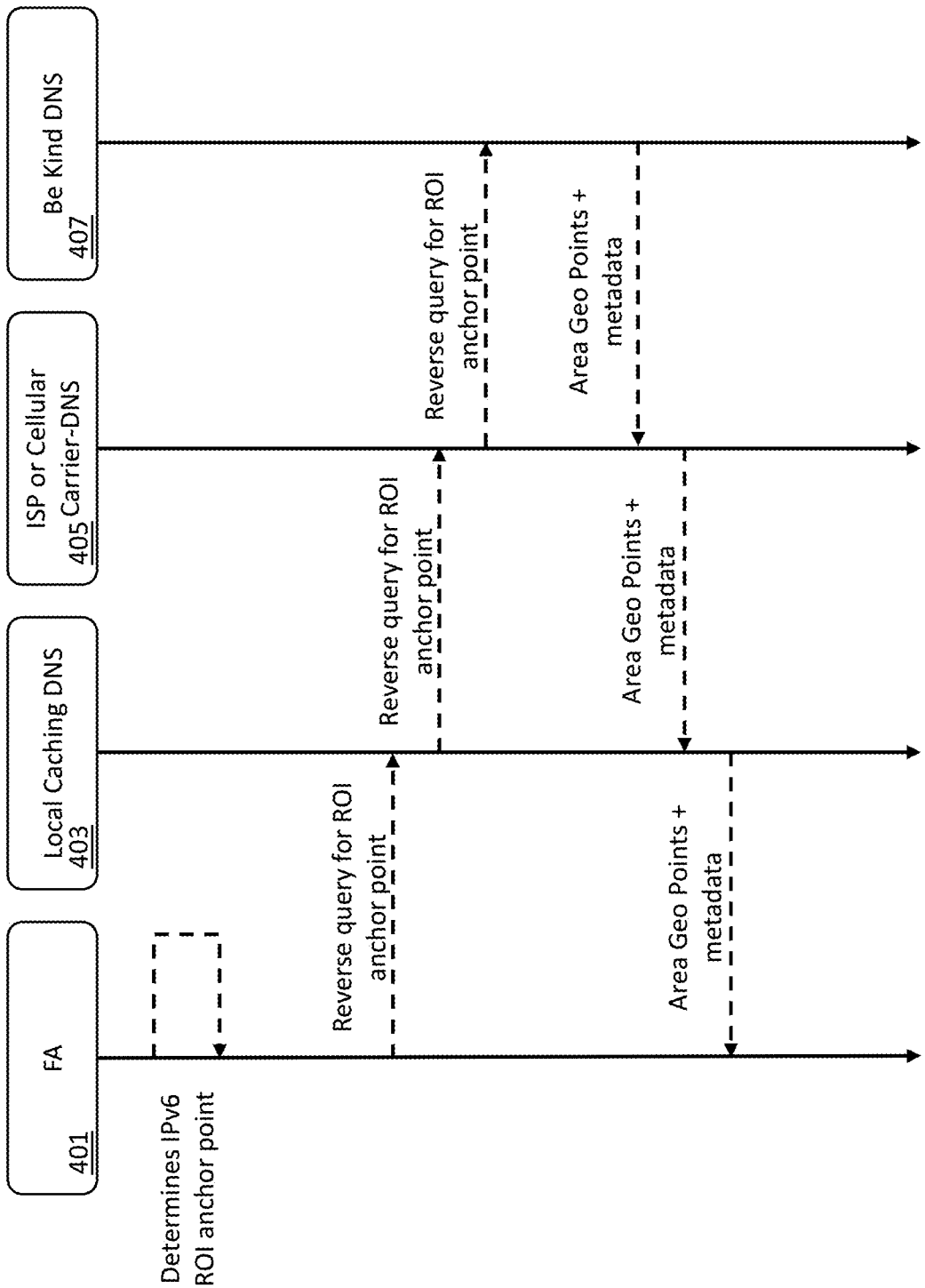
FIG. 6 illustrates querying for metadata and corresponding geographic location points according to one embodiment of the present invention.

In one embodiment, the location data and its interaction with compensation and the devices is based on an IP location management and resolution system, wherein queries for location information and compensation transactions include an IP address related to a 3D geographic space, as described in U.S. patent application Ser. No. 14/728,259, which is incorporated by reference herein in its entirety. Each IP address (preferably an IPv6 address) is associated with a specific coordinate and/or a group of coordinates, and the server is operable to return the metadata associated with each IP address, geographic location, associated group of locations, and/or an associated geofence. FIG. 6 illustrates one embodiment of a querying system wherein a fencing agent (FA) 401 on a device is operable to determine an IPv6 address of the device (e.g., by translating a geographic location to an IP address) and send a query for the IPv6 address to the Local Caching DNS 403. The local Domain Name System (DNS) is operable to further update and/or query a DNS of an ISP or cellular carrier 405, which is further operable to query and/or update based on a DNS of the compensation system 407. The return response from any of the DNSs include metadata associated with the geographic point and/or any related geographic points. For example, in one embodiment, an office complex is associated with a geofence that includes a set of geographic points (all resolved to an IPv6 address). Upon submitting a transaction request, such as a request for rewarding compensation to a coworker user account, the system is operable to determine that an IP address included in the request is associated with the geofence of the office complex and track, store, and manage the transactions accordingly. Advantageously, this allows, in one embodiment, for the compensation data to be viewed by office managers or prospective employees to determine which complexes have the highest number of transactions or amount of compensation. If compensation such as "nudges" are used, then this allows for the nudges to be an indicator of the reputation of a business or geographic area.

Figure 7:
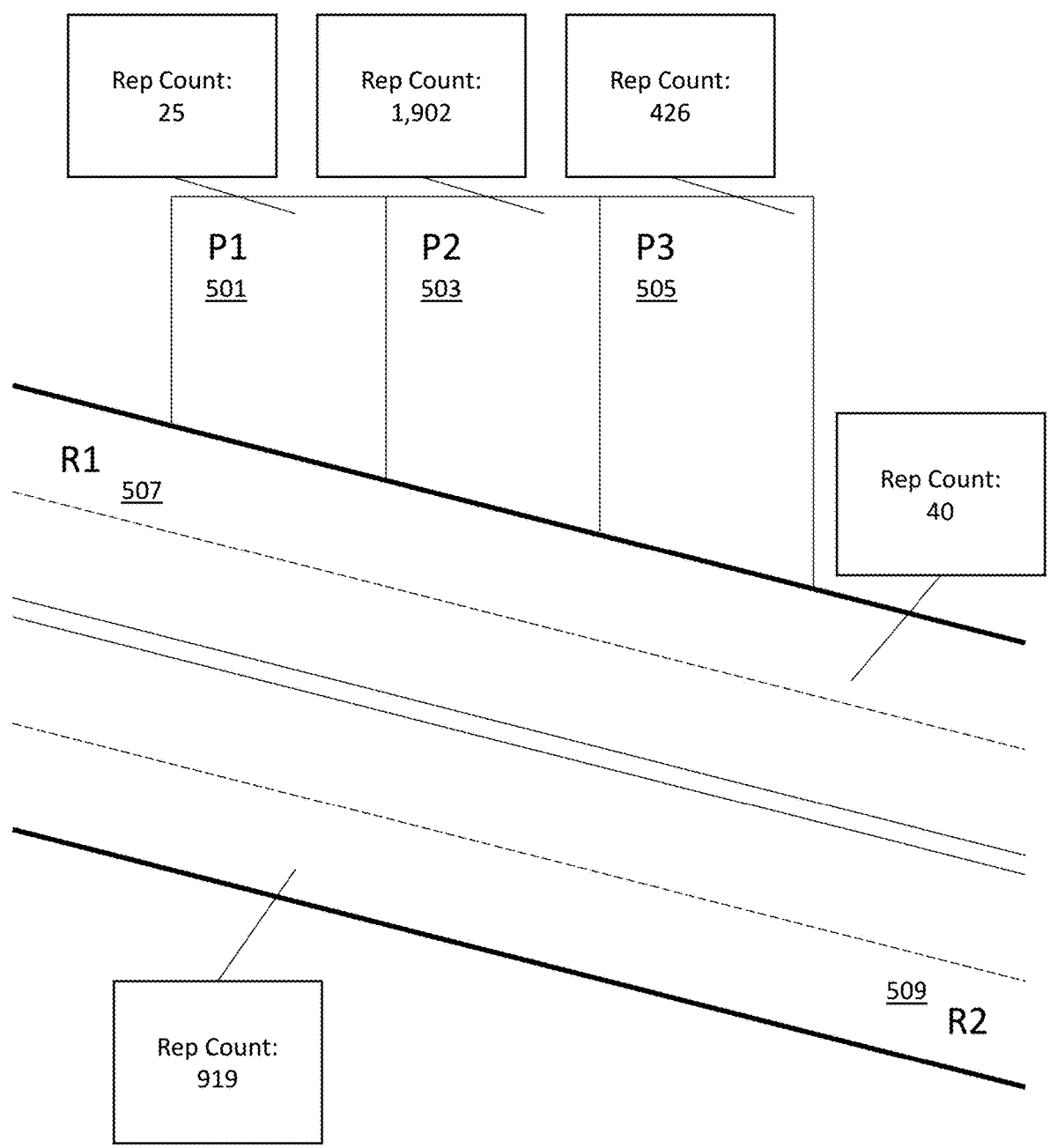
FIG. 7 illustrates compensation management across multiple geographic locations according to one embodiment of the present invention.

FIG. 7 illustrates one embodiment of a location-based management of transaction data, which is maintained by the IP geographic mapping system illustrated in FIG. 6 and described above. FIG. 7 illustrates three different properties, Property 1 (P1) 501, Property 2 (P2) (503), and Property 3 (P3) (505), wherein each of the properties are associated with a reputation score based upon the number of transactions that have occurred within the property. For example, P1 501 is associated with a nudge count of 25, corresponding to a determined number of nudges given within the property boundaries. Road 1 (R1) 507 and Road 2 (R2) 509 similarly include associated geographic boundaries, and the system is operable to track and analyze the transactions occurring along each of the roadways. In one embodiment, roads are divided by intersections or blocks. In another embodiment, a whole length of a road is associated with compensation transactions.

In one embodiment, each location or group of locations are associated with multiple levels of ownership, rules, statistics, and available transactions. For example, in one embodiment, P1 501 includes three tiers of ownership, wherein a location within P1 501 is associated with a first tier for the office property, a second tier for the neighborhood, and a third tier for the city. Transactions and compensation rules are governed by each of the three tiers. For example, the first tier restricts compensation from being given within the P1 501 boundaries more than once per day. The second tier allows only nudges and financial microtransactions to be made within the neighborhood boundaries, and the third tier only allows mobile phones to give and receive compensation. Notably, these rules expand to any rules known in the art of geofencing, microtransactions, digital interactions, or related technologies.

Tiers for a geographic location are not limited to 2D space, but instead the rules are additionally operable to be associated with a vertical space. For example, in one embodiment, a first governing entity is associated with a space above a geographic area (e.g., for drone operations), a second governing entity is associated with a land space (e.g., for pedestrian or vehicle travel), and a third governing entity is associated with a space below the land (e.g., for subway systems or mining equipment). In one embodiment, the geographic area and the rules applying to the geographic area are temporarily established for a predetermined amount of time. For example, certain rules applying to a roadway are only enforced during busy commute hours. In another non-limiting example, a geographic area with rules is temporarily established during an event, e.g. a festival. When the festival is over, the rules no longer apply to the geographic area, and any associated data is not accessible to users within the geographic area.

Figure 8:
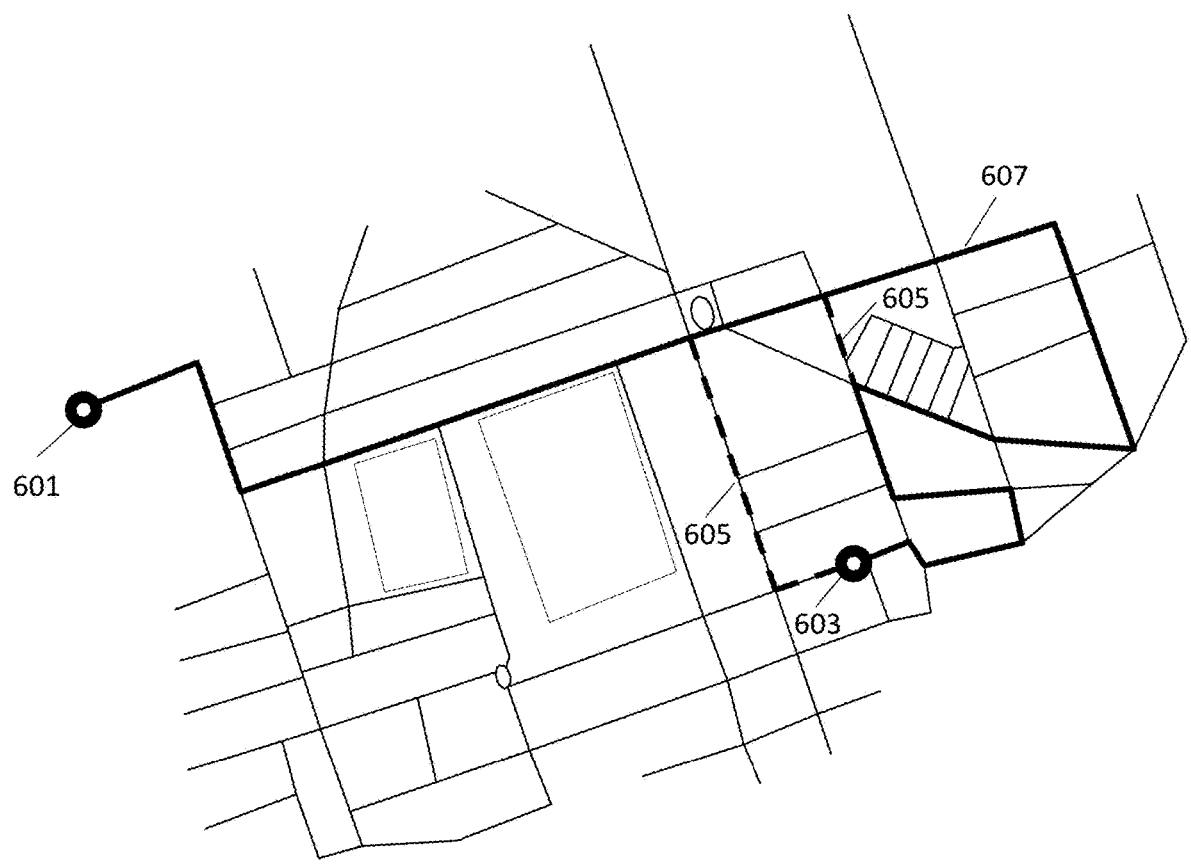
FIG. 8 illustrates a navigation system using compensation data according to one embodiment of the present invention.

FIG. 8 illustrates one embodiment of the stored transaction and compensation data being used by a vehicle navigation system. In one embodiment, the vehicle navigation system receives from a user account a desired threshold for compensation levels for travel. For example, the navigation system receives a desired threshold level for roadways with at least 500 nudges in the past month. The navigation system interfaces with the compensation system to determine which roadways between a starting point 601 and a destination point 603 satisfy the threshold and suggests a route based on the desired threshold. In the illustrated embodiment, the dashed lines 605 represent roadways that do not meet the threshold. The navigation system is operable to determine a route that avoids these roadways and instead suggest a route that has a high compensation rate and therefore is likely to correlate to positive interactions while driving.

In transportation applications, the present invention provides a benefit in that the system is operable to provide suggestions for positive interactions that were not previously available. For example, if used to encourage positive behaviors, a high number of transactions and/or a high compensation level from these transactions correlates to a high amount of positive interactions. In an autonomous vehicle embodiment, this allows for interactions related to positivity and kindness to be captured and acted upon by a computer system, whereas before the present invention, the prior art has not been able to adequately reproduce unique behaviors of humans and determine appropriate behaviors that promote socially positive outcomes. Providing rules and thresholds for interactions within geographic boundaries based on individual thresholds and preferences incentivizes the promotion of the desired actions.

In one embodiment, rules and regulations for operations within a given tier, class, and/or 3D geographic space or environment are governed according to a key, license, or permission held by an account associated with a governing entity. For example, the system is operable to receive and enforce rules corresponding to a requirement for vehicles within a governed space to be all gas vehicles or be all electric vehicles, wherein the rules are established in the system by an owner or regulator account associated with a key, license, or permission.

In another embodiment, the system is operable to enforce and/or manage rules according to determined environmental conditions. For example, upon determining a weather condition is present, such as rain, the system is operable to enforce a rule that limits the maximum traveling speed of a vehicle. In another example, upon determining that heavy traffic is in a certain area, the system is operable to enforce a set following distance between vehicles. These environmental determinations are determined either through direct detection (e.g., detection via cameras, LIDAR, or other sensors through devices connected to the system) or by retrieval of information from an external resource server (e.g., a weather station doppler, a server providing current weather conditions, or a system that provides live traffic conditions). In another embodiment, the environmental conditions are user-reported. The rules and regulations enforced by the governing entities are, in one embodiment, rules corresponding to a compensation amount or reputation level. For example, in one embodiment, during a determined snowstorm, only drivers with a total received compensation of 700 nudges are permitted to drive on a highway.

Preferably, interactions are not limited only to person-to-person interactions but are also related to object-to-person interactions or person-to-object interactions. For example, in one embodiment, a trash receptacle in a public space is operable to connect to a user device and provide compensation to the account associated with the user device upon trash being deposited in the trash receptacle. In another embodiment, accounts associated with a supermarket are operable to receive compensation directly from shoppers. In yet another embodiment, interactions on an airline flight are operable to occur between individuals (e.g., flight attendants, pilots, and/or passengers) and/or directly between the airline and the individual. For example, in one embodiment, because of a positive interaction with a flight attendant, the system is operable to receive a request for compensation to be provided to the flight attendant, which is thereby associated with and/or provided to multiple tiers, including the flight attendant, the flight crew, the flight route, the airline, and/or the airport. The system is operable to provide the compensation and transaction information, for example, to prospective travelers according to a searched flight route to aid in the selection of the trip with the historically most positive interactions.

The present invention is, in one embodiment, not limited only to managing positive interactions (e.g., financial micropayments or increases in point totals) but instead managing includes negative interactions. Negative interactions include, for example, the subtraction of tracked and managed values from a user account. This includes, in one embodiment, subtraction of points, debiting of financial value, removal of rewards, removal of coupons, restriction in functionality or operating of related devices, or any other measurable value transfer known in the art. In one embodiment, the system is operable to present both positive compensation and negative compensation separately (e.g., when showing compensation associated with specific properties). In another embodiment, the compensation is provided as a net calculation of the positive and negative interactions. Compensation and transactions, in one embodiment, serve as a basis and/or threshold for operating rules within a space. For example, navigation systems on an autonomous vehicle do not allow for a driver associated with a user account with 250 nudges to manually driving within a location that requires a threshold of 500 nudges. Preferably, the rules in this space are governed by the owning entity, as described above, such that owners of the geographic locations set rules for device activity while approaching the location, while entering the location, while dwelling in the location, and while exiting the location.

Figure 9:
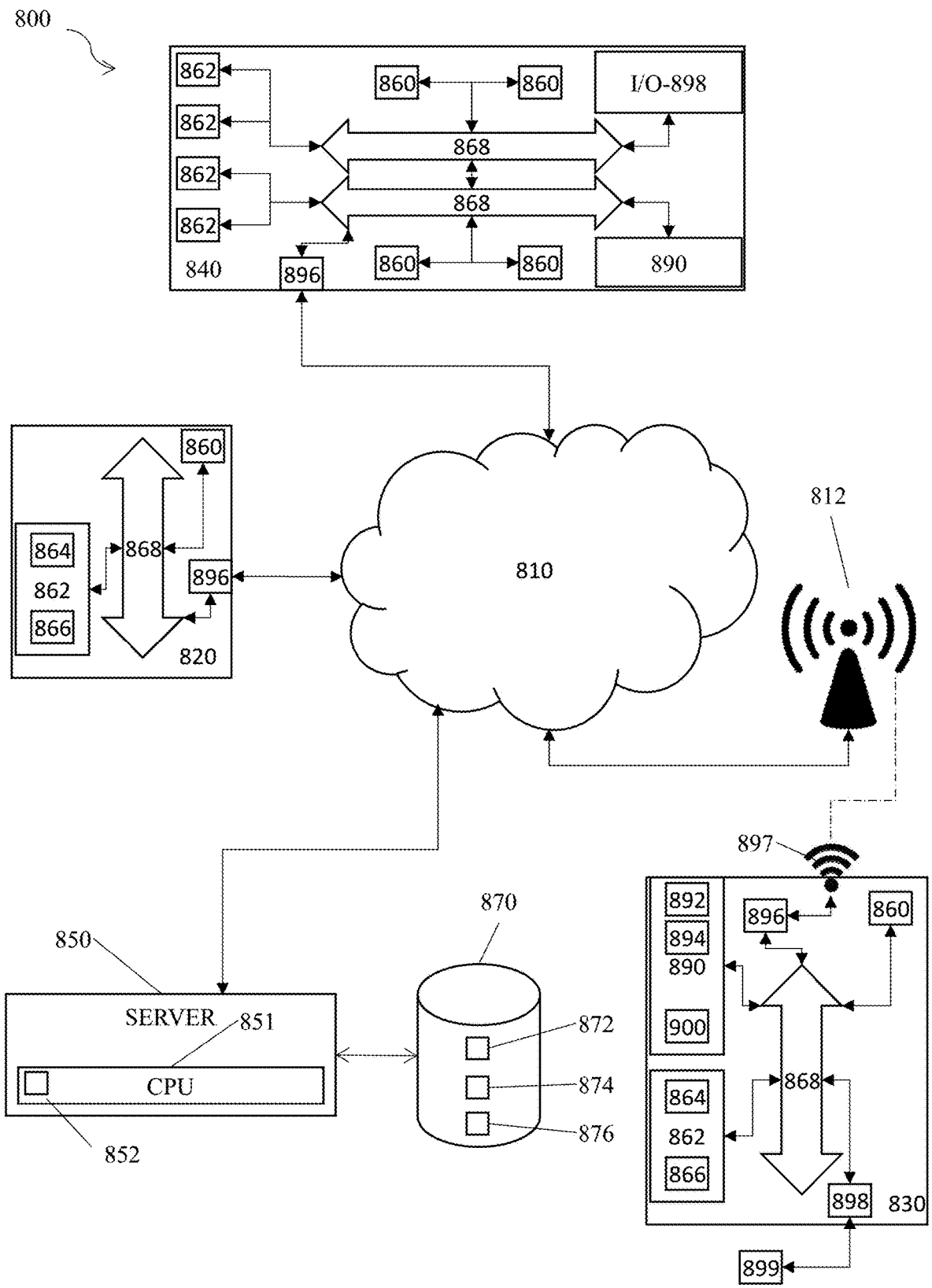
FIG. 9 is a schematic diagram of a system of the present invention.

FIG. 9 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 9, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable to be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 9, is operable to include other components that are not explicitly shown in FIG. 9, or is operable to utilize an architecture completely different than that shown in FIG. 9. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

The above-mentioned examples are provided to serve the purpose of clarifying the aspects of the invention, and it will be apparent to one skilled in the art that they do not serve to limit the scope of the invention. By nature, this invention is highly adjustable, customizable and adaptable. The above-mentioned examples are just some of the many configurations that the mentioned components can take on. All modifications and improvements have been deleted herein for the sake of conciseness and readability but are properly within the scope of the present invention.

The invention claimed is:

1. A system for managing compensation for behaviors, comprising:
   a server platform, including a processor and a memory, in communication with at least one service point and a plurality of user devices;
   each of the at least one service point including a geofence;
   each of the plurality of user devices being associated with one of a plurality of user profiles, including a quantity of tokens;
   the server platform receiving a token transfer request from a first user device within the geofence, wherein the token transfer request includes a designation of at least one other user device within the geofence;
   the server platform generating and transmitting a recommended compensation amount to the first user device, wherein the recommended compensation amount is based on rules associated with the geofence and based on a historical score associated with the first user device;
   an artificial intelligence module of the server platform generating the historical score based off a number of tokens previously transferred by the first user device, a number of tokens previously received by the first user device, historical scores of recipients of the tokens previously transferred by the first user device, and historical scores of senders of the tokens previously received by the first user device;
   the first user device requiring a minimum historical score in order to transact with the at least one other user device;
   the server platform receiving at least one assistance request from at least one user device, including location data for the at least one user device;
   the server platform generating a publicly visible map interface on the at least one user device, labeling a location of the at least one assistance request on the publicly visible map interface, and displaying a historical score for at least one user profile associated with the at least one assistance request on the publicly visible map interface; and
   the server platform transferring at least one token from the first user device to the at least one other user device in response to the token transfer request.

2. The system of claim 1, wherein the server platform receives a compensation request from a user device, and wherein the server platform automatically transfers an amount of fiat currency to a financial account associated with the user device in exchange for one or more tokens in response to the compensation request.

3. The system of claim 1, wherein each of the plurality of user devices is associated with at least one vehicle and wherein a position of the at least one vehicle on a road is dependent on the quantity of tokens in the one of the plurality of user profiles associated with each of the plurality of user devices.

4. The system of claim 1, wherein the quantity of tokens in each user profile includes a first set of tokens and a second set of tokens, and wherein the first set of tokens is only transferred from user profiles and the second set of tokens is only received by user profiles.

5. The system of claim 1, wherein the server platform is further in communication with at least one restricted location, wherein the at least one restricted location is associated with a minimum token requirement, and wherein the server platform restricts access and/or use of the at least one restricted location by user profiles having a quantity of tokens less than the minimum token requirement.

6. The system of claim 1, wherein the server platform records a number of tokens transferred and/or a number of token transfer requests made inside the geofence of each of the at least one service point.

7. The system of claim 1, wherein the server platform is further in communication with at least one rules manager, wherein the at least one rules manager determines rules and conditions for generating a token transfer request by any user device proximate to one or more of the at least one service point using environmental conditions and/or governing entities.

8. A system for managing compensation for behaviors, comprising:
   a server platform, including a processor and a memory, in communication with at least one service point and a plurality of user devices;
   each of the plurality of user devices being associated with one of a plurality of user profiles, including a quantity of tokens;
   each of the at least one service point including a geofence;
   the server platform receiving a token transfer request from a first user device within the geofence, wherein the token transfer request includes a designation of at least one other user device within the geofence;
   the server platform generating and transmitting a recommended compensation amount to the first user device, wherein the recommended compensation amount is based on rules associated with the geofence and based on a historical score associated with the first user device;
   an artificial intelligence module of the server platform generating the historical score based off a number of tokens previously transferred by the first user device, a number of tokens previously received by the first user device, historical scores of recipients of the tokens previously transferred by the first user device, and historical scores of senders of the tokens previously received by the first user device;

the server platform transferring at least one token from the first user device to the at least one other user device in response to the token transfer request; and each of the plurality of user devices being associated with at least one vehicle and wherein a position of the at least one vehicle on a road is dependent on the quantity of tokens in the one of the plurality of user profiles associated with each of the plurality of user devices.

9. The system of claim 8, wherein the server platform receives a compensation request from a user device, and wherein the server platform automatically transfers an amount of fiat currency to a financial account associated with the user device in exchange for one or more tokens in response to the compensation request.

10. The system of claim 8, wherein the quantity of tokens in each user profile includes a first set of tokens and a second set of tokens, and wherein the first set of tokens is only transferred from user profiles and the second set of tokens is only received by user profiles.

11. The system of claim 8, wherein the server platform is further in communication with at least one restricted location, wherein the at least one restricted location is associated with a minimum token requirement, and wherein the server platform restricts access and/or use of the at least one restricted location by user profiles having a quantity of tokens less than the minimum token requirement.

12. The system of claim 8 wherein the server platform records a number of tokens transferred and/or a number of token transfer requests made inside the geofence.

13. A method for managing compensation for behaviors, comprising:

providing a server platform, including a processor and a memory, in communication with at least one service point and a plurality of user devices;

each of the at least one service point including a geofence;

each of the plurality of user devices being associated with one of a plurality of user profiles, including a quantity of tokens;

the server platform receiving a token transfer request from a first user device within the geofence, wherein the token transfer request includes a designation of at least one other user device within the geofence;

the server platform generating and transmitting a recommended compensation amount to the first user device, wherein the recommended compensation amount is based on rules associated with the geofence and based on a historical score associated with the first user device;

the server platform transferring at least one token from the first user device to the at least one other user device in response to the token transfer request; and the server platform automatically providing a preset number of tokens to at least one user profile at regular time intervals;

an artificial intelligence module of the server platform generating the historical score based off a number of tokens previously transferred by the first user device, a number of tokens previously received by the first user device, historical scores of recipients of the tokens previously transferred by the first user device, and historical scores of senders of the tokens previously received by the first user device.

14. The method of claim 13, further comprising the server platform receiving a compensation request from a user device, and the server platform automatically transferring an amount of fiat currency to a financial account associated with the user device in exchange for one or more tokens in response to the compensation request.

15. The method of claim 13, wherein each of the plurality of user devices is associated with at least one vehicle and wherein a position of the at least one vehicle on a road depends on the quantity of tokens in the one of a plurality of user profiles associated with each of the plurality of user devices.

16. The method of claim 15, wherein the at least one vehicle associated with each of the plurality of user devices includes at least one autonomous vehicle, and wherein a first autonomous vehicle associated with a first user device automatically passes a second autonomous vehicle associated with a second user device in response to a transfer of at least one token from the second user device to the first user device.

17. The system of claim 8, wherein the autonomous vehicle automatically sets a route to a destination, and wherein the route is automatically chosen such that the autonomous vehicle travels through a zone with a greatest number of transactions that have occurred.

18. The system of claim 1, wherein the recommended compensation amount is further based off a compensation balance, an affiliation, a class, previous activities, and/or a geographic location associated with the first user device.

* * * * *